United States Patent [19]

Aquila

[11] 4,000,823

[45] Jan. 4, 1977

[54] COMPACT CRANE

[76] Inventor: Joseph Aquila, 144-41 231 St., Rosedale, N.Y. 11422

[22] Filed: Jan. 31, 1975

[21] Appl. No.: 545,930

[52] U.S. Cl. .............................. 214/86 A; 280/402
[51] Int. Cl.² ......................................... B60D 3/12
[58] Field of Search ................. 214/86 A, 85, 86 R; 280/402

[56] References Cited
UNITED STATES PATENTS

| | | | |
|---|---|---|---|
| 2,197,406 | 4/1940 | Fleming et al. | 214/86 A |
| 2,449,146 | 9/1948 | Ryan | 214/86 A |
| 2,625,279 | 1/1953 | Dalby et al. | 214/86 A |
| 3,599,811 | 8/1971 | Watkins | 214/86 A |
| 3,667,631 | 6/1972 | Bishop | 214/86 A |
| 3,687,315 | 8/1972 | Donaldson | 214/86 A |
| 3,719,294 | 3/1973 | Aquila | 214/86 A |

Primary Examiner—Robert J. Spar
Assistant Examiner—James M. Slattery
Attorney, Agent, or Firm—Ostrolenk, Faber, Gerb & Soffen

[57] ABSTRACT

A compact truck-mounted towing crane is constructed with a boom pivoted near the center thereof. A tow bar secured at the rear end of the boom is positioned below the boom pivot, and a power cylinder is connected to the forward end of the boom for raising a vehicle which is to be towed. The boom pivot is at the rear of a base secured to the frame of the towing vehicle and the power cylinder is secured to the front of the base. The relative positions of the boom and power cylinder are such that the power cylinder arm is retracted during the power stroke to lower the front end of the boom, thereby raising the tow bar and the load thereon.

The tow bar together with the portion of the boom to the rear of the main pivot are removable as a unit by simply withdrawing a pivot pin which connects front and rear sections of the boom together in the vicinity of the main pivot. The rear section is movable about this pivot pin between an extended or working position and a storage position wherein the tow bar is positioned above and to the rear of the main pivot.

3 Claims, 5 Drawing Figures

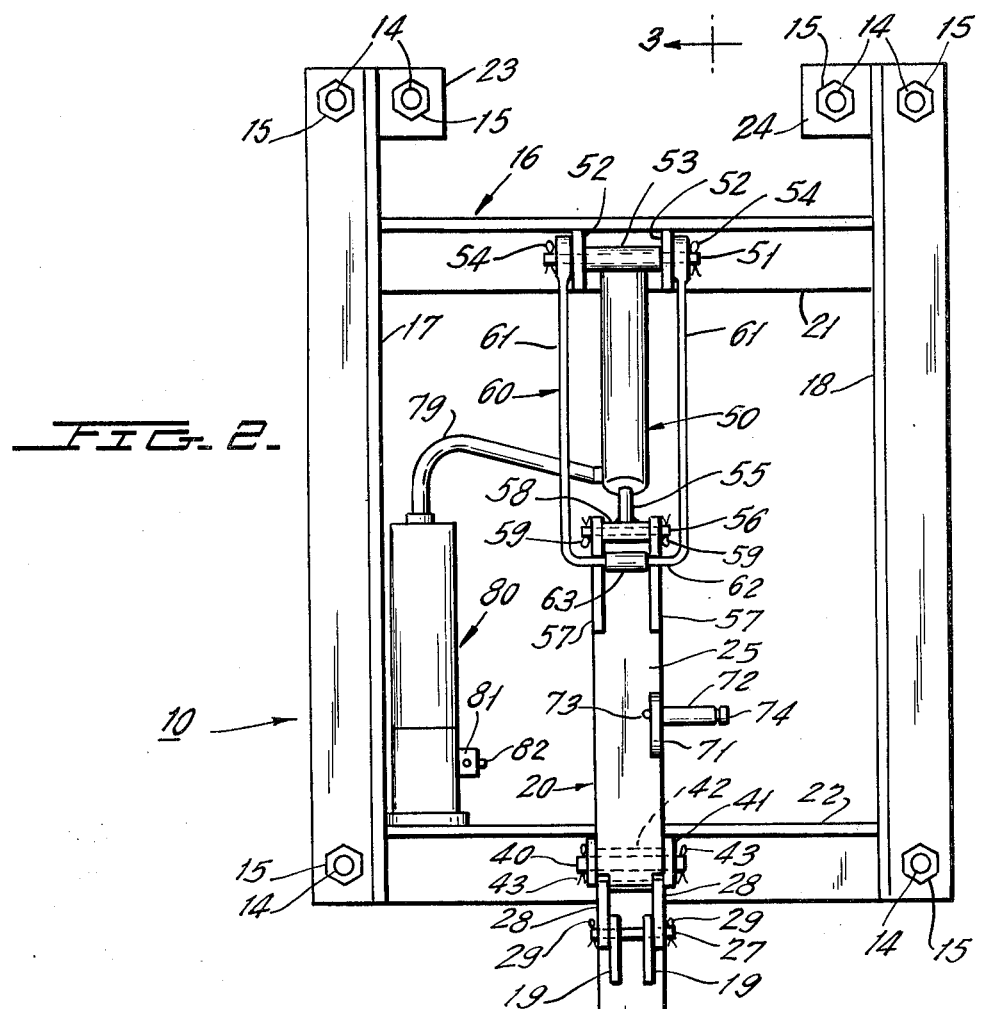
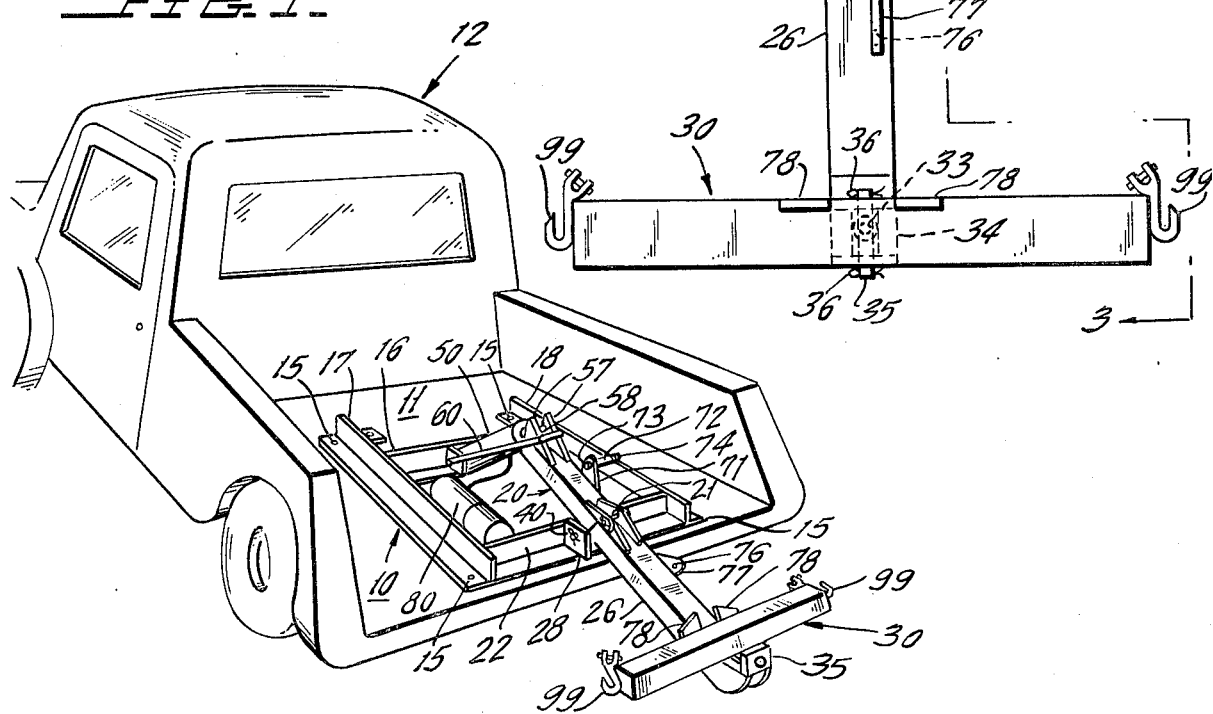
FIG. 2.
FIG. 1.

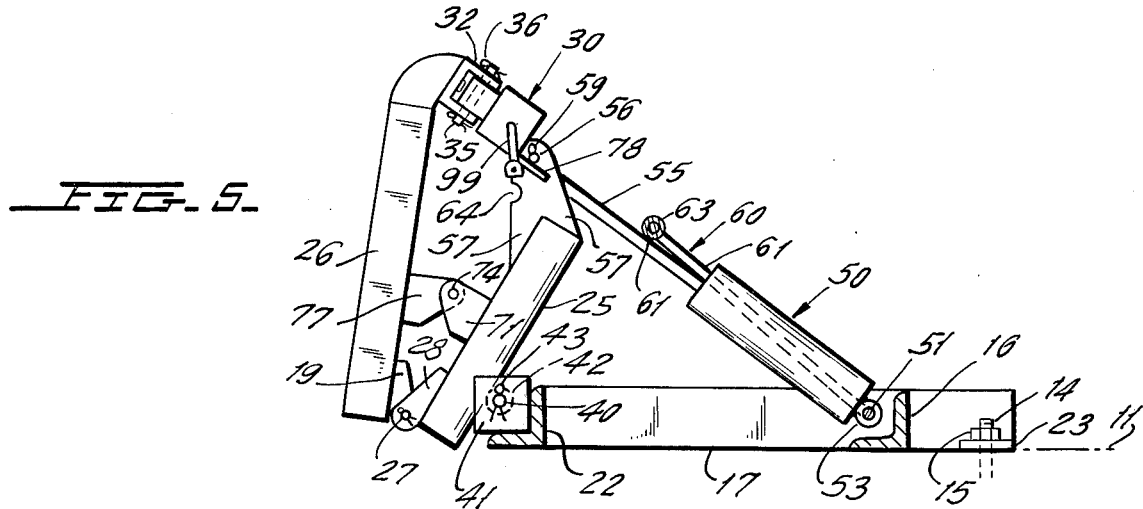
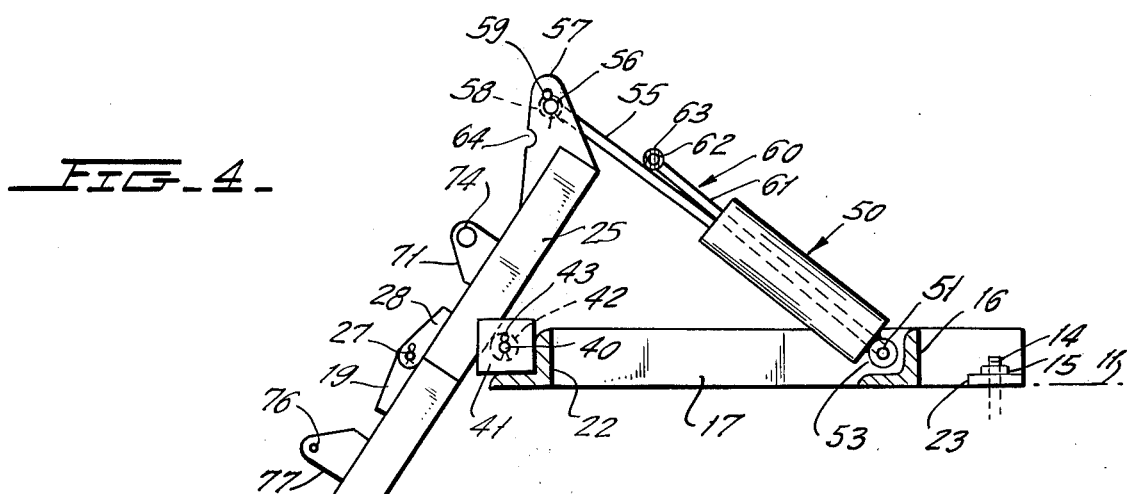
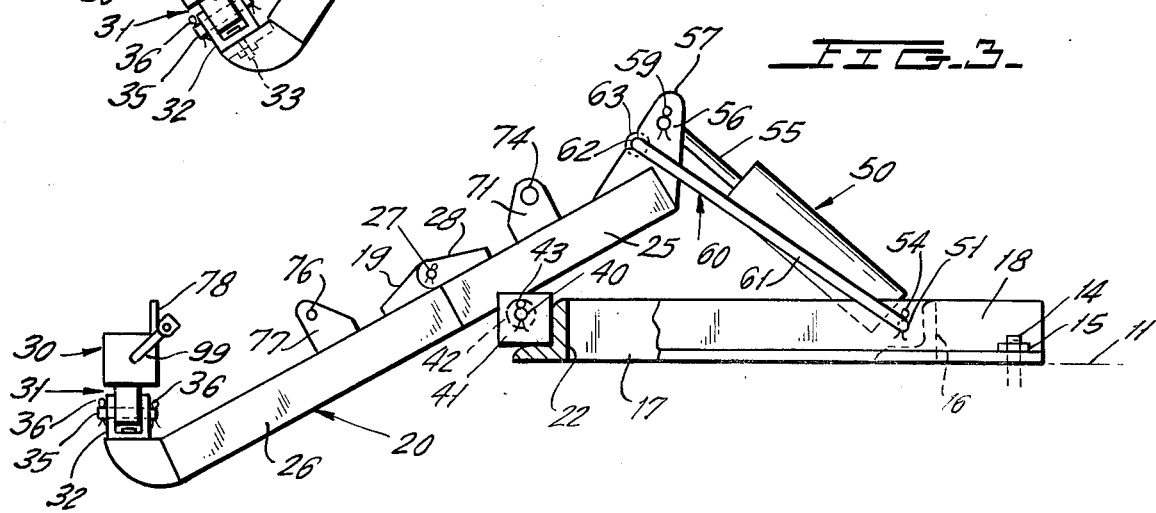

COMPACT CRANE

This invention relates to cranes in general and more particularly relates to an extremely compact truck-mounted crane, sections of which are readily removable so that the tow truck may be used for other purposes.

My U.S. Pat. No. 3,719,294, issued Mar. 6, 1973, for Tow Bar Apparatus discloses a construction for a crane designed for mounting in pickups and other relatively light-duty vehicles. When so mounted the crane in my aforesaid patent is useful for towing even relatively heavy automobiles.

In accordance with the instant invention, an extremely compact lightweight construction is provided for a crane mountable in relatively light-duty and even covered vehicles, and is usable for towing automobiles. The boom of the crane is mounted at the rear end of a base secured to the frame of the towing vehicle and is pivoted with respect thereto on a main pivot located at the rear of the towing vehicle. A tow bar is mounted on a universal joint at the free end of the rear section. The front section of the boom is connected to a power cylinder that is mounted to the front of the base in a position such that the working stroke of the cylinder retracts the arm thereof to raise the tow bar.

The front and rear sections are connected by a readily removable pivot pin which permits the rear section and tow bar to be dismounted as a unit so that the tow may be used for other purposes. The pivot pin serves as a pivot about which the rear section is movable between a lowered position wherein the tow bar is in its operating position and a raised position wherein the tow bar is in a storage position.

Accordingly, a primary object of the instant invention is to provide a novel compact lightweight crane for towing motor vehicles.

Another object is to provide a crane of this type having a boom that is pivoted at its mid-region.

Still another object is to provide a crane of this type in which the boom is operated for lifting a load by the working stroke of a power cylinder which retracts the extendable arm of the power cylinder.

A further object is to provide a crane of this type that is suitable for installation in a truck having a covered load carrying area.

A still further object is to provide a crane of this type in which the rear portion of the boom is pivotally mounted to the front portion of the boom so that the tow bar may be moved to a storage position when not in use.

Yet another object is to provide a crane of this type in which the rear section of the boom and the tow bar are readily removable as a unit from the front section of the boom.

These objects as well as other objects of this invention shall become readily apparent after reading the following description of the accompanying drawings, in which:

FIG. 1 is a perspective showing a crane, constructed in accordance with the instant invention, mounted on a pickup truck.

FIG. 2 is a plan view of the crane of FIG. 1, with the tow bar in a raised load carrying position.

FIG. 3 is a cross-section taken through line 3—3 of FIG. 2, looking in the direction of arrows 3—3.

FIGS. 4 and 5 are views similar to that of FIG. 3 showing the elements in different operating positions.

In FIG. 4 the tow bar is in its lowered position for picking up a load, and in FIG. 5 the tow bar and lower section of the boom are pivoted upward to a storage position.

Now referring to the figures. Crane unit 10 is shown in FIG. 1 as being mounted on closed bed 11 of pickup truck 12 being secured to the frame thereof by six bolts 14 and nuts 15 located at the corners of generally rectangular base 16. The latter is constructed of longitudinally extending angle irons 17, 18 connected by respective front and rear transverse angle irons 21, 22. The front ends of longitudinal members 17, 18 are provided with horizontal inward extensions 23, 24, respectively, each of which is provided with a clearance aperture through which one of the mounting bolts 14 extends.

Crane 10 further includes elongated boom 20 constructed of hollow stock rectangular in cross-section. The front section 25 of boom 20 is pivotally connected to rear boom section 26 by pin 27 that extends through aligned clearance apertures in a pair of spaced bearing plates 19, 19. The latter project upwardly from rear boom section 26 and are welded thereto. Pin 27 also extends through aligned clearance apertures in bearing plates 28, 28 that project upwardly from front boom section 25, are welded thereto, and are positioned adjacent the outer surfaces of bearing plates 19, 19. Cotter pins 29, 29 removably retain pivot pin 27 in its operative position shown. Hollow transverse tow bar 30 is connected for limited pivotal movement at the center thereof to the free end of rear boom section 26 by universal joint means 31. The latter includes yoke 32 pivotally connected to rear boom section 26 by bolt 33, member 34 welded to tow bar 30 and extending between the arms of the yoke 32, and pin 35 that extends through aligned clearance apertures in the arms of yoke 32 and member 34. Cotter pins 36, 36 removably retain pivot pin 35 in its operative position shown.

Boom 20 is mounted to main pivot 40 disposed at the rear of base 16 midway between longitudinal members 17, 18. Main pivot 40 extends through aligned apertures in spaced bearing plates 41, 41 welded to rear transverse member 22 as well as through sleeve 42 that is positioned between bearing plates 41, 41 and is welded to the lower surface of front boom section 25 near the rear end thereof. Cotter pins 43, 43 removably retain main pivot pin 40 in the operative position shown. If desired, bearing plates 41, 41 may be extended upward to confront more extensive portions of boom 20 for increased lateral stability of boom 20.

Fluid operated power cylinder 50 is pivotally mounted to base 16 at pin 51 which extends through aligned clearance apertures in spaced bearing plates 52, 52 welded to forward transverse base member 21. Pin 51 also extends through sleeve 53 positioned between bearing plates 52, 52 and welded to the rear of cylinder 50. Cotter pins 54, 54 removably retain pivot pin 51 in the operative position shown. Power cylinder 50 is provided with rearwardly extending arm 55 whose rear end is pivotally connected to the front of boom 25 at pivot pin 56. The latter extends through clearance apertures in spaced bearing plates 57, 57 welded to front boom section 25 and extending upward and forward thereof. Pin 56 also extends through sleeve 58 welded to the rear end of arm 55 and positioned between bearing plate 57, 57. Cotter pins 59, 59 removably retain pin 56 in the operative position shown.

Safety device 60 consists of parallel longitudinally extending elongated arms 61, 61 positioned at opposite sides of power cylinder 50 and connected by web 62 having sleeve 63 surrounding the central portion thereof. The free ends of arms 61, 61 are flattened, being positioned adjacent the outboard surfaces of bearing plates 52, 52 and being provided with clearance apertures through which pin 51 extends. Thus, pin 51 constitutes a pivot for safety device 60. Web 62 is positioned to be received by safety notches 64, 64 in bearing plates 57, 57 when tow bar 30 is in its towing position of FIG. 3 to prevent accidental lowering of tow bar 30.

Upwardly extending plate 71 welded to front boom section 25 is provided with sleeve 72 which slidably supports pin 73. The latter is biased to the left with respect to FIG. 2 and is manually retractable to the right by grasping handle 74. Plate 77 welded to rear boom section 26 is provided with clearance aperture 76 operatively positioned to receive the free end of pin 73 when tow bar 30 is in the storage position shown in FIG. 5. In this position of tow bar 30, spaced plates 78, 78 welded to tow bar 30 are positioned on opposite sides of bearing plates 57, 57 to stabilize tow bar 30 against tilting.

Flexible hose 79 connects the rear end of power cylinder 50 to unit 80 which includes an electric motor operated pump and a fluid reservoir. Switch 81 controls the motor operated pump for delivering fluid under pressure to cylinder 50 for its working stroke during which arm 55 is retracted. Control button 82 operates a valve (not shown) for permitting fluid to flow slowly from power cylinder 50 to the reservoir portion of unit 80 thereby permitting arm 55 to be extended and tow bar 30 lowered.

In operation, when truck 12 is being driven to the location of a disabled vehicle, rear boom section 26 is pivoted about pin 27 to the storage position of FIG. 5, being retained therein by holding pin 73 disposed within aperture 76. At this time it is preferable that power cylinder arm 55 be extended as shown. Upon reaching the scene of the disabled vehicle, pin 73 is retracted from aperture 76 and rear boom section 26 is pivoted downward into axial alignment with front boom section 25. This positions tow bar 30 considerably below and to the rear of truck bed 11 (FIG. 4).

In a manner known to the art, chain mounted hooks (not shown) are then engaged with frame portions of the disabled vehicle and the hook carrying chains are then slipped into hooks 99, 99 welded to the ends of tow bar 30. Switch 81 is then operated to actuate unit 80 for pumping pressurized fluid into power cylinder 50 to retract arm 55. This causes clockwise tilting of boom 20 about main pivot 40 with respect to FIG. 4, thereby raising tow bar 30 and the disabled vehicle. During this operation, web portion 62 of safety 60 rides along arm 55 and then along bearing plates 57, 57 until being aligned with safety notches 64, 64. At this point switch 81 is opened and switch 82 is actuated thereby permitting the weight of the disabled vehicle to pivot boom 20 slightly counterclockwise until safety 60 is deeply seated in recesses 64, 64.

Although not illustrated, it should now be apparent to those skilled in the art that the crane construction hereinbefore described is so compact that crane device 10 is operable even when a camping hood (not shown) is mounted over load bed 11 of truck 12. Further, the combined weight of tow bar 30 and rear boom section 26 is so little that the assembly of parts 26 and 30 may readily be handled for dismounting by merely removing one of the cotter pins 29, 29 and pivot pin 27. With tow bar 30 and rear boom section 26 dismounted, and with power cylinder arm 50 fully retracted, the remaining elements of crane unit 10 will not interfere with loading and carrying a relatively large load on truck bed 11. In addition, main pivot 40 and connecting pivot pin 56 may also be readily removed for dismounting of front boom section 25.

Although preferred embodiments of this novel invention have been described, many variations and modifications will now be apparent to those skilled in the art, and it is therefore preferred that the instant invention be limited not by the specific disclosure herein but only by the appending claims.

The embodiments of the invention in which an exclusive privilege or property is claimed are defined as follows:

1. A crane including an elongated boom means; main pivot means supporting said boom means at a point intermediate its front and rear ends; tow bar means mounted to the boom means at said rear end; power operating means connected to said boom means at said front end for moving said front end downward and frontward in a working stroke to raise said tow bar means and a load connected thereto; said power operating means including a fluid operated power device having an extendable operating arm which is retracted in said working stroke; a base having said main pivot means at the rear thereof and said power operating means at the front of said base; said boom means including a front section and a rear section connected to said front section in the vicinity of said main pivot means; said rear section being pivotably movable with respect to said front section between an operating position wherein said tow bar means is below and rearward of said main pivot means and a storage position wherein said tow bar means is positioned in front of and above said main pivot means; quick release retaining means to hold said rear section in said retracted position; a safety means pivotally mounted to said rear of said base and, when in a holding position, operatively engageable with said front section of said boom means to limit lowering of said tow bar means when a load is connected thereto.

2. The crane and elongated boom means of claim 1 in which the rear section of said boom means is removably connected to said front section thereof.

3. The crane and elongated boom means of claim 1 including means engageable between said front section and said tow bar means to stabilize the latter when said front section is in said storage position.

* * * * *

UNITED STATES PATENT OFFICE
CERTIFICATE OF CORRECTION

Patent No. 4,000,823          Dated January 4, 1977

Inventor(s) Joseph Aquila

It is certified that error appears in the above-identified patent and that said Letters Patent are hereby corrected as shown below:

Column 4, line 53 - Delete "The" and substitute therefor --A--

Column 4, line 53 - Delete "and elongated boom means of" and substitute therefor --as set forth in--

Column 4, line 56 - Delete "The" and substitute therefor --A--

Column 4, line 56 - Delete "and elongated boom means of" and substitute therefor --as set forth in--

*Signed and Sealed this*

*Eighteenth* Day of *October 1977*

[SEAL]

Attest:

RUTH C. MASON        LUTRELLE F. PARKER
*Attesting Officer*     *Acting Commissioner of Patents and Trademarks*